United States Patent [19]

Curving, III

[11] Patent Number: 5,682,917
[45] Date of Patent: Nov. 4, 1997

[54] OVERFLOW AND ISOLATION VALVE

[76] Inventor: John Curving, III, 324 Peal Ct., Roswell, Ga. 30076

[21] Appl. No.: 622,322

[22] Filed: Mar. 29, 1996

[51] Int. Cl.$^6$ ............................................. F16K 24/04
[52] U.S. Cl. ........................... 137/15; 137/202; 137/800
[58] Field of Search ................................. 137/202, 433, 137/800, 15

[56] References Cited

U.S. PATENT DOCUMENTS

| | | | |
|---|---|---|---|
| 2,504,474 | 4/1950 | Van Oss | 137/433 X |
| 2,767,552 | 10/1956 | Clute | 137/433 |
| 3,563,263 | 2/1971 | Benson | 137/202 |
| 3,736,950 | 6/1973 | Smallwood | 137/202 |
| 4,036,255 | 7/1977 | Wilson | 137/202 X |
| 4,094,346 | 6/1978 | Mild | 137/202 X |
| 4,535,799 | 8/1985 | Boley | 137/174 |
| 5,435,335 | 7/1995 | Klop | 137/202 |
| 5,443,561 | 8/1995 | Sakata et al. | 137/202 |

OTHER PUBLICATIONS

Overfill Prevention Valve Sales Literature; Copyright 1992.

*Primary Examiner*—Gerald A. Michalsky
*Attorney, Agent, or Firm*—Isaf, Vaughan & Kerr; Charles H. Fails

[57] ABSTRACT

An overflow and isolation valve is disclosed. The overflow and isolation valve includes a valve body having a chamber defined therein, and an integral leg member formed as part of the valve body having a proximal end on the valve body and a distal end extending away therefrom. A bore is defined within the leg member extending from the distal end to the proximal end thereof, and is in generally fluid-tight communication with the chamber formed within the valve body. An integral float assembly is provided as a part of the valve for sealing the distal end of the leg member in response to the liquid level within the tank. A threaded annular ring is formed within the bore of the leg member intermediate the proximal and distal ends thereof, and faces inwardly of the bore for receiving a threaded plug thereon, the threaded plug being passed through a vapor recovery system riser opening defined in the valve body in substantial registry with the bore of the leg member so that the plug forms a fluid-tight and pressure-tight seal between the leg member and the chamber within the valve body without having to first remove the float assembly.

20 Claims, 2 Drawing Sheets

5,682,917

1

OVERFLOW AND ISOLATION VALVE

FIELD OF THE INVENTION

This invention relates in general to overflow valves used on underground storage tanks. More particularly, this invention relates to an overflow and isolation valve mounted on a fuel storage tank to both prevent the overflow of liquid fluid from within the tank into a vapor recovery system used with the tank, and to isolate the tank from the vapor recovery system.

BACKGROUND OF THE INVENTION

The use of underground storage tanks, and in particular underground fuel storage tanks, has become commonplace. Oftentimes a "tank farm" of underground fuel storage tanks are provided at service stations for use in fueling automobiles for example, as well as for any number of other commercial uses. As is known, in order to efficiently fill an underground storage tank, the tank will typically have two openings, one through which a fluid, for example gasoline, is passed into the tank, the second of which is a vent opening to allow the air within the tank to pass through the vent opening rather to avoid creating a backpressure condition within the tank, making fluid transfer into the tank more difficult and time consuming.

Conventional underground tank farms also include a ventilation system which includes, for example, a vent line extending from each tank to a common manifold and from the manifold to the atmosphere. A common manifold, as well as other shared piping or ventilation lines are used in order to conserve resources and to minimize costs in constructing the tank farm. However, a problem that arises with tank farms, and in particular tank farms which are crossvented to one another, arises when one of the tanks within the farm is overfilled beyond capacity. When this condition occurs, fluid may be passed upward through the vent opening of the overfilled tank and into the vent lines and manifold of the ventilation system, and then allowed to pass therethrough into other tanks thus contaminating the fluid held within other of the tanks in the tank farm. In order to combat this problem, overflow valves placed on the vent lines of the tanks, the overflow valve being constructed to close prior to the time that the fluid within the tank can pass through the valve, and thus the vent, and into the common ventilation manifold.

As known to those skilled in the art, these overflow valves typically have a removable ball-float and cage assembly which is threaded into an extractor fitting, known to those in the trade as an extractor tee, the extractor tee itself in turn being threaded into the bung of the tank. When fluid is added to the tank, the increasing liquid level within the tank, if not otherwise stopped, will eventually raise the float into a valve seat formed as a part of the ball-float and assembly, thus creating a generally fluid-tight seal between the tank and the ventilation system.

Over time, and in accordance with Federal, State, and Local environmental protection laws, these tank ventilation systems constructed as a part of underground tank farms have been used as Phase I vapor recovery systems. For example, the underground ventilation systems at service stations are used as the phase I recovery systems for fumes and other airborne emissions generated from the storage of petroleum products in underground tanks.

Moreover, in order to conduct pressure/leak testing of the tanks and the vapor recovery system piping, the need arose to isolate the individual tanks of the tank farm from one another and from the vapor recovery system as this testing occurs. This is typically done by passing a tool through a riser at the surface grade above the tank, and extending the tool downward toward and into the extractor tee whereupon the ball-float and cage assembly is threadedly removed from the extractor tee and withdrawn upward therethrough, as well as through and out of the riser.

After the ball-float and cage assembly is removed, a threaded plug is passed downward through the riser and the extractor tee, and threaded into the threaded opening of the extractor tee in which the ball-float and cage assembly had previously been threaded. Although this has proven to be an efficient means for isolating the tanks of a tank farm from each other, and from the vapor recovery system, the removal of the ball-float and cage assembly is required. On occasion the ball-float and cage assembly is not reinstalled within the extractor tee, and thus the problem of cross contamination within the tank farm results when any one, or combination, of the tanks is overfilled. A more typical problem results from wear or damage to the ball-float and cage assembly mounting threads, when, for example, the threads become cross threaded and the assembly cannot be properly seated within the extractor tee and extended downward into the tank. Damage to the threads of either or both the ball-float and cage assembly and the extractor tee may thus require an expensive, and in the case of an extractor tee, time consuming, repair and/or replacement.

Early examples of overflow valves constructed for use with ventilation and/or vapor return lines of underground storage tanks are disclosed in U.S. Pat. No. 3,563,263 to Benson, issued Feb. 16, 1971, and to Klop, U.S. Pat. No. 5,435,335 issued Jul. 25, 1995. As shown in FIGS. 1 of both Benson and Klop, these overflow valves are either positioned on the tank, or in a vent line returning from the tank, and are provided to prevent the accidental overflow of liquid fluid through the vent and into the common portion of the ventilation and/or vapor recovery system. Neither of these overflow valves, however, provide for the isolation of the tank while also acting to safeguard against accidental overflows. In Benson, for example, the overflow valve is threaded into the bung of an underground storage tank, but no means is provided to access the valve from above ground for the purpose of isolating individual tanks from the common underground ventilation system used in the tank farm.

Thus, what is needed, but seemingly unavailable in the art is an overflow valve constructed and arranged for not only preventing the overflow of the liquid within a tank into the common ventilation and/or the vapor return lines of an underground tank farm, but an overflow valve which also provides for the isolation of the tank from the ventilation and/or vapor return lines without the necessity of removing the ball-float and cage assembly therefrom.

SUMMARY OF THE INVENTION

Briefly described, the present invention provides an improved overflow and isolation valve which overcomes some of the design deficiencies of other overflow valves known in the art by providing one valve that acts both as an overflow valve to prevent the accidental overflow or spillage of fluid from within a tank to other tanks, and which also acts to isolate the tank on which the valve is installed from the other tanks of an underground tank farm, as well as from the underground ventilation and/or vapor return lines of the tank farm vapor recovery system.

Thus, the overflow valve disclosed herein includes a valve body constructed and arranged for being in fluid-tight communication with an underground ventilation and/or vapor recovery system, the valve body having a chamber defined within and including an elongated leg member formed as a part of the valve body, the leg member having a proximal end on the valve body and a distal end extending away from the valve body. A continuous bore is defined within the leg member and extends along a longitudinal axis from the distal end to the proximal end of the leg member, the bore being in fluid-tight communication with the chamber defined within the valve body. The valve includes an integral float assembly positioned with respect to the distal end of the leg member, the float assembly being constructed and arranged for movement from an open position into a generally fluid-tight closed position on the distal end of the leg member in response to the change of the liquid level within the tank to prevent the passage of the liquid in the tank through the distal end of the leg member into the valve body, and thus into the ventilation and/or vapor return lines of the vapor recovery system.

The novel overflow valve of this invention also includes a threaded annular ring formed as a part of the leg member, the ring extending inwardly of the bore toward the longitudinal axis of the bore, the annular ring being positioned intermediate the proximal end and the distal end of the leg member. A vapor recovery system riser opening is defined within the valve body in substantial registry with the bore within the leg member, so that a threaded plug sized and shaped to be threadedly received on the annular ring may be passed through the riser opening and into and through the valve body, and downward into the leg member until it is threadedly received on the annular ring providing both a pressure-tight and a fluid-tight seal between the tank and the valve body.

Thus, the valve body of this invention is formed as a monolithic valve body including the leg member thereof. The valve body is formed from either cast iron or aluminum. The threaded plug received on the annular ring is formed of either brass or bronze so that it does not spark while being threaded into the annular ring.

The float assembly of the invention includes a float, the float having an elongated stem with a proximal end fastened to the float, and a distal end extending away from the float, the stem being received within an annular collar having a central opening defined therein for receiving the stem for reciprocal movement within, the collar being positioned within the bore of the leg member intermediate the annular ring and the distal end of the leg member, the collar guiding the stem, and thus the float, with respect to the distal end of the leg member.

Therefore, it is an object of the present invention to provide an improved overflow and isolation valve in which the float assembly need not be removed in order to isolate an underground storage tank from an underground vapor recovery system, or vice versa.

It is another object of the present invention to provide an improved overflow and isolation valve with an integral float assembly to ensure that the valve will continue to act as an overflow valve both before and after testing of the tank and/or the vapor recovery system.

It is yet another object of the present invention to provide an improved overflow and isolation valve in which a threaded plug can be passed downward into the valve to provide a fluid-tight and pressure-tight seal between the valve and the tank without removing the ball-float and cage assembly of the valve.

Still another object of the present invention is to provide an improved overflow and isolation valve adapted for use with underground fluid storage tanks having a common ventilation manifold and/or vapor recovery system.

Still another object of the invention is to provide an improved overflow and isolation valve which is simple in design and operation, is inexpensive to construct and is durable and rugged in structure.

Thus, these and other objects, features, and advantages of the invention will become apparent upon reading the specification when taken into conjunction with the accompanying drawings wherein like characters of reference designate corresponding parts throughout the several views.

DETAILED DESCRIPTION

Figure 1:
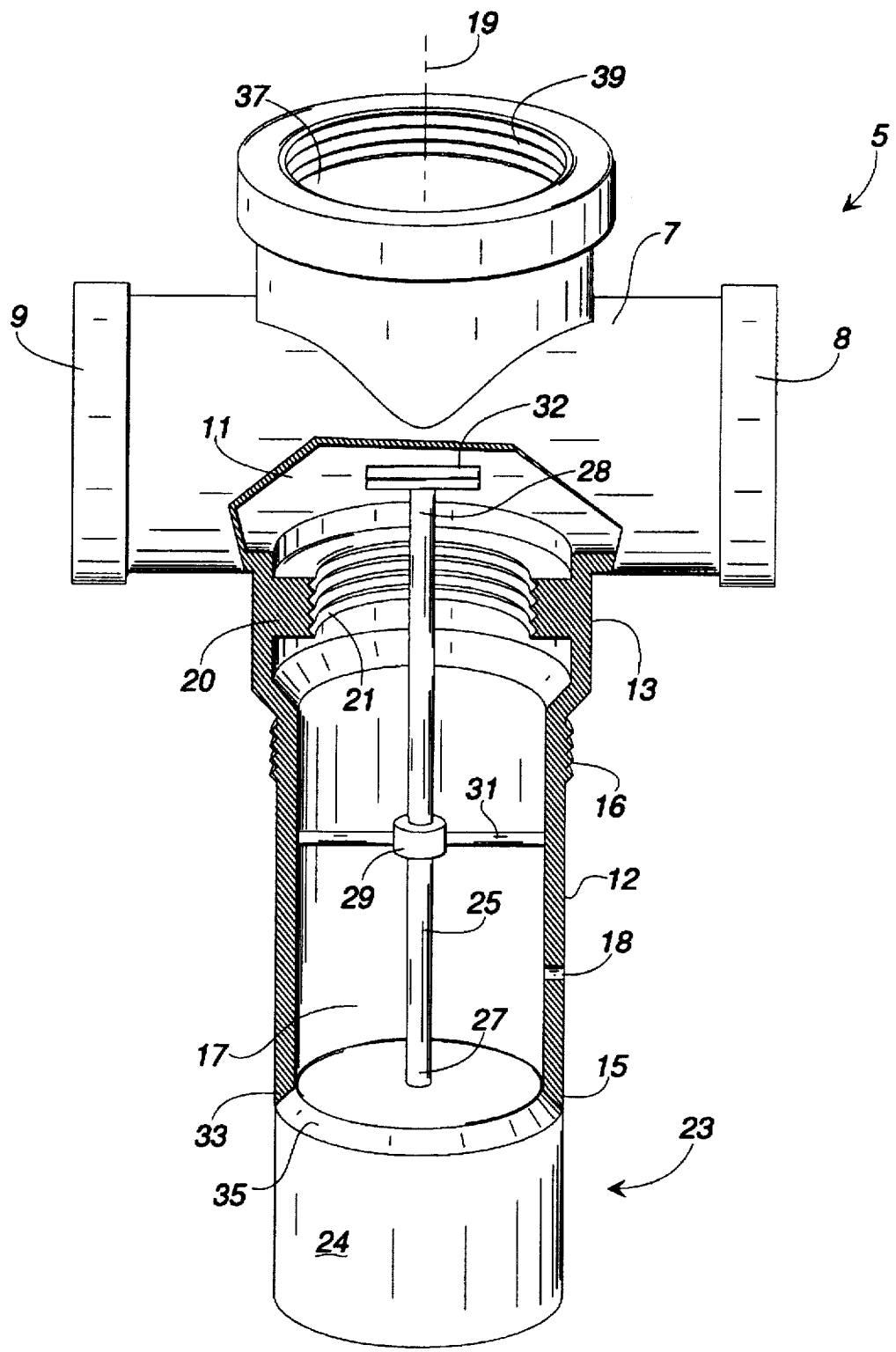
FIG. 1 is a partially cut-away perspective view of a preferred embodiment of the overflow and isolation valve of this invention.
Figure 2:
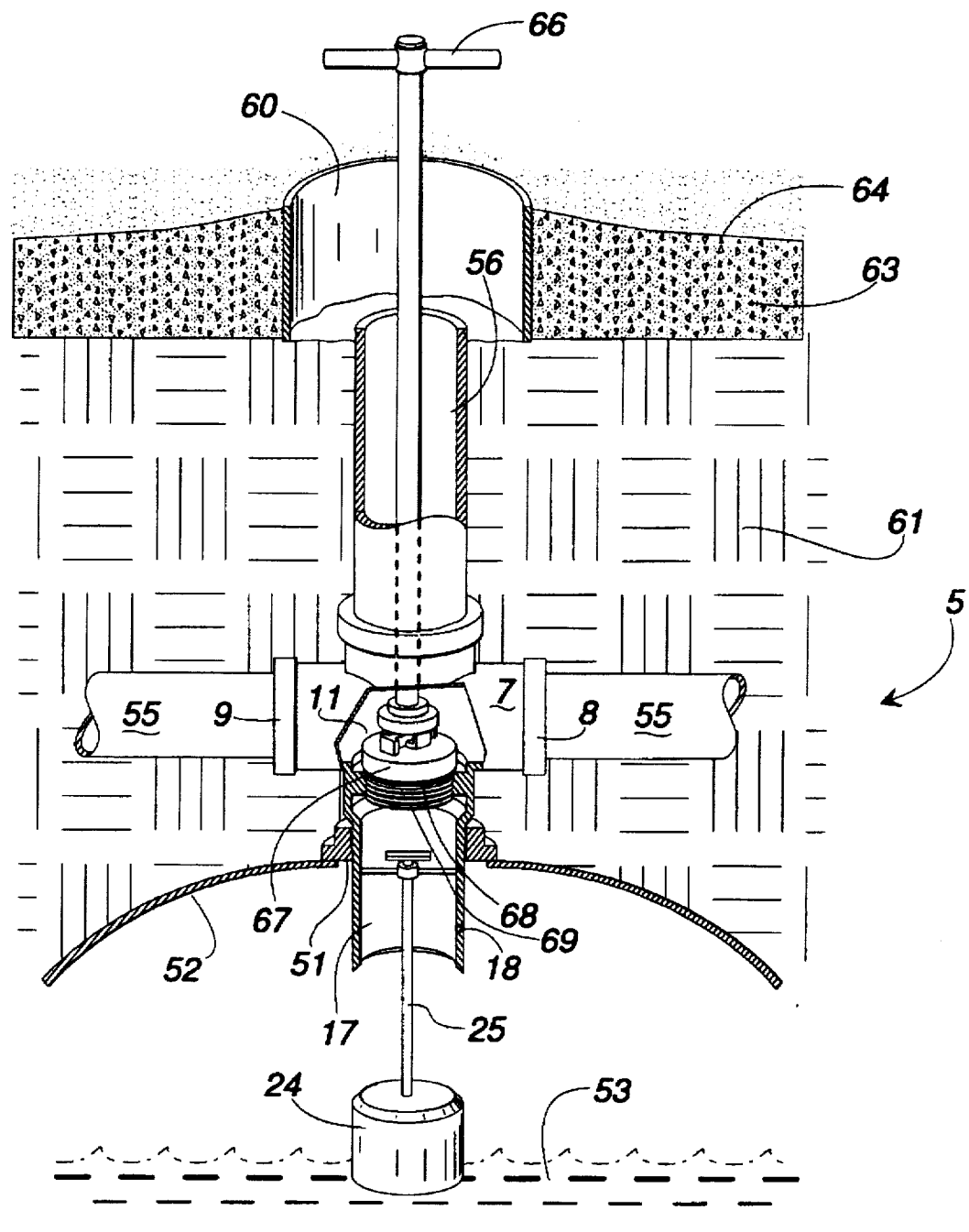
FIG. 2 is a partially cut-away partial perspective view of the overflow and isolation valve of FIG. 1 in use on an underground storage tank.

Referring now in detail to the drawings, in which like reference numerals indicate like parts throughout the several views, numeral 5 of FIGS. 1 and 2 illustrates a preferred embodiment of the overflow and isolation valve of this invention. As shown in FIG. 1 the overflow and isolation valve has an elongated valve body 7 having a first end 8 and a spaced second end 9. Both first end 8 and second end 9 are provided with threads (not illustrated) for receiving either ventilation piping or the vapor return lines of a vapor recovery system.

Valve body 7 has a chamber 11 defined therein and extending from first end 8 toward second end 9 so that fluid may pass freely through the valve body. Still referring to FIG. 1, valve body 7 includes an integral leg member 12 formed as a part thereof, valve body 7 and leg member 12 cast together as a monolithic structure. It is anticipated, although not illustrated here, that leg member 12 could be welded, threaded into valve body 7, or otherwise fastened thereto so long as that once leg member 12 is fastened to valve body 7, leg member 12 will be a permanent part of the valve body and form a permanent part thereof. Leg member 12 has a proximal end 13 formed on valve body 7, and a distal end 15 extending away from the valve body. Intermediate the proximal and distal ends of the leg member, and along the exterior periphery or circumference of the leg member, is a mounting thread 16 so that overflow and isolation valve 5 can be threadedly received within the bung 51 of tank 52, as illustrated generally in FIG. 2.

Leg member 12 of FIG. 1 includes a continuous bore 17 defined therein and extending along longitudinal axis 19 from the proximal end to the distal end of the leg member. So constructed, bore 17 is generally in fluid-tight communication with chamber 11 within valve body 7, although a vent opening 18 is defined within the leg member intermediate proximal end 13 and distal end 14 in known fashion for the purpose of allowing the fill hose (not illustrated) supplying liquid to the tank to drain empty once the float assembly closes on the distal end of the leg member, as shown in FIG. 1, and the backpressure created within the tank otherwise stops the mass or bulk transfer of fluid into the tank before it overflows into the vapor recovery system. It is anticipated that vent opening 18 will be approximately one-eight of an inch in diameter and will extend from inside bore 17 through leg member 12.

An annular ring 20 is formed along the inside circumference or periphery of the leg member 12 intermediate the proximal and distal ends thereof, and is positioned above vent opening 18 described above. Annular ring 20 projects inwardly toward longitudinal axis 19 of bore 17. A helical thread 21 is provided on the surface of annular ring 20 facing toward the longitudinal axis of the bore. So constructed, annular ring 20 is constructed to threadably receive a plug 67 (FIG. 2) passed through valve body 7 and received on the annular ring, plug 67 forming a fluid-tight and pressure-tight seal between leg member 12 and valve body 7 once the plug is threaded into position.

Overflow and isolation valve 5 of FIG. 1 includes a float assembly 23 similar in concept to the ball-float and cage assemblies of the known overflow valves. Here, and unlike the prior art. However, float assembly 23 is formed as an integral, i.e., fixed or non-removable, part of overflow and isolation valve 5.

Float assembly 23 includes a float 24 having a stem 25 with a proximal end 27 fixed on the float and a distal end 20 extending away therefrom and through a collar 29 supported about longitudinal axis 19 of bore 17. Collar 29 is held in position by at least one support rod 31, two support rods 31 being shown in FIGS. 1 and 2, so that it is rigidly held within bore 17. A stop 32 is formed or otherwise fastened to distal end 28 of stem 25, and prevents stem 25 from falling out of collar 19 once the float assembly has been placed in position on the overflow and isolation valve.

Float 24 is shown in FIG. 1 in its generally fluid-tight closed position on the distal end of leg member 12. This occurs when a float seat 35 formed along the top circumference of float 24 is received within, and on, matching valve seat 33 formed on the distal end of leg member 12, as shown in FIG. 1.

FIG. 1 also shows a vapor recovery system riser opening 37 defined in valve body 7 in registry with bore 17. Opening 37 is provided with a helical thread 39 for receiving a vapor recovery system riser 56 (FIG. 2) therein. It is anticipated that vapor recovery system riser opening 37 will be formed about longitudinal axis 19 of bore 17, and will be in registry with bore 17 defined within leg member 12 so that plug 67 (FIG. 2) can be passed therethrough, through valve body 7, and received on annular ring 20 as described hereinabove.

Referring now to FIG. 2, overflow and isolation valve 5 is shown threadedly received within the bung 51 of an underground storage tank 52 in which a liquid level 53 is maintained. Although liquid level 53 is shown in one position within tank 52, it is understood by those skilled in the art that liquid level 53 can fluctuate toward and away from the distal end 15 of the overflow and isolation valve, and that although float assembly 23 is shown in its open position in FIG. 2, that the float assembly will be moved to its closed position, as shown in FIG. 1, in response to the increase of the liquid level 53 within tank 52 during filling operations. It is anticipated, as is known to those skilled in the art, that float assembly 23 will be closed on the distal end of the leg member when the liquid level within tank 52 is at 95% capacity by volume of tank 52. This is done by sizing leg member 12, i.e. sizing its length between its distal and proximal ends, in conjunction with the diameter and volume of tank 52. Thereafter, vent opening 18 will allow the fill hose (not illustrated) to slowly drain empty as air from inside the tank vents through opening 18 and into the vapor recovery system as is known to those familiar with the art.

Still referring to FIG. 2, vapor return lines 55 are shown being threadedly received within first end 8 and second 9 of valve body 7, so that valve body 7 is in fluid-tight communication with the vapor return lines. It is anticipated that valve body 7 will also be constructed for being in pressure-tight communication with vapor return lines 55, as well as for being in both fluid-tight and pressure-tight communication with vapor recovery system riser 56 shown being threadedly received within riser opening 37 (FIG. 1). It is anticipated that the ends of riser 56 received within spill container 60 will have a vapor return fitting (not illustrated) having a cap (not illustrated) removably received thereon in pressure-tight and fluid-tight fashion.

Overflow and isolation valve 5 is constructed for use on underground storage tanks 52 as shown generally in FIG. 2, in which overflow and isolation valve 5 is shown received on an underground storage tank 52 buried under a layer of earth 61, with a layer of pavement 63 thereabove, on top of which a surface grade 64 exists, and through which spill container 60 extends. However, valve 5 may just as easily be used on any liquid fluid storage tank situated above, or below, ground.

As shown in FIG. 1, when float assembly 23 is in its closed position, the distal end 28 of stem 25 may extend upward beyond annular ring 20 and into chamber 11 of valve body 7. In FIG. 2, however, float assembly 23 is shown in its generally open position, in which stop 32 is positioned below annular ring 20. However, as constructed, and as described in greater detail below, it is anticipated that plug 67 can be received within annular ring 20 regardless of whether float assembly 23 is in its closed, or in its open position.

Should float assembly 23 be in its closed position as shown in FIG. 1, it is anticipated that plug 67 will push stop 32 downward, in turn pushing stem 25, and thus float 24 downward into tank 52 until such time as plug 67 may be threaded into annular ring 20, as float 24 will be sized and shaped so that although it will float i.e., will be biased, into a closed position on distal end 15 of leg member 12 when liquid within tank 52 rises, it will not be sized so large that it will not be able to be pushed downward into the liquid level, if so needed, in order to isolate tank 52 from valve 5.

Thus, and unlike the prior art overflow devices, at no time will it be necessary to take a tool similar to plug tool 66 (FIG. 2) to remove a ball cage and float assembly performing the same function as float assembly 23, install a plug similar to plug 67 for isolation of the tank and/or vapor recovery system, only to then remove the plug and once again reinstall the ball float and cage assembly to ensure that the level of the liquid within tank 52 does not overflow up to and through leg member 12 into chamber 11 of valve body 7.

Accordingly, and as shown in FIG. 2, a tee-handled plug tool 66 has a plug 67 affixed at its end thereto in conventional fashion. Although not illustrated in greater detail, it is understood by those skilled in the art that plug 67 is received on plug tool 66 in much the same manner that the conventional and removable ball-float and cage assemblies of the prior art overflow valves are threadedly placed within, and removed from, an extractor tee. Accordingly, the end (not illustrated) of tool 66 received on plug 67 fits within a recess (not illustrated) defined in the top surface of plug 67, the end of the tool having a pair of arcuate fingers (not illustrated) which extend underneath a rod (not illustrated) extending between two projections (not illustrated) formed on either side of the recess of the top surface of plug 67 for holding the plug as it is passed downward through riser 56, and subsequently through riser opening 37, valve body 7, and received on threads 21 of annular ring 20, whereupon plug 67 is threaded into position on annular ring 22 to isolate valve body 7, and chamber 11 therein, from leg member 12 and, in turn, tank 52. As shown generally in FIG. 2, plug 67 includes a flexible O-ring 68, positioned above a helical thread 69 sized and shaped to be received within helical thread 21 of annular ring 20. After plug 67 is threaded into position on annular ring 20, any pressure testing of tank 52, or of vapor return lines 55 and/or riser 56 may take place to determine whether the tank, and the vapor recover system, are fluid-tight in accordance with any applicable Federal, State, Local and/or municipal environmental control laws, rules, or regulations.

Thus, not only are the problems with failing to reinstall the ball-cage and float assembly or the prior art overflow valves overcome, the isolation of tank 52 from the vapor recovery system and/or ventilation system forming a part of the underground tank farm (not illustrated) is greatly simplified by merely passing plug 67 downward onto annular ring 20, threading it into position, and removing the plug once the tank no longer need be isolated. Should plug 67 not be removed after testing is done, the operator or other person filling tank 52 will become aware of this fact due to the decreased or otherwise slowed fill rate within tank 52 due to the creation of backpressure within the tank, as the tank will not otherwise vent through overflow and isolation valve 5.

Valve body 7 and leg member 12 may be constructed of cast iron, aluminum, or any other durable and rigid material resistant to corrosion and providing an acceptable service life in underground environments in contact with ground water, and/or petroleum products. Collar 29 and support rod 31 will be formed of the same material of which leg member 12 and valve body 7 are constructed. However, it is anticipated that float 24 as well as stem 25 and stop 32 will be constructed of aluminum.

As shown in FIGS. 1 and 2 therefore, overflow and isolation valve 5 presents a unique, durable, yet simple solution to the problem of ensuring that the overflow valve will always function to prevent the overflow of fluid from within tank 52 into the vapor recovery system of the tank farm; while also providing for the quick and easy isolation of tank 52 from the vapor recovery system when pressure testing of the tank and/or the vapor recovery system is desired, or mandated.

While a preferred embodiment of the invention has been disclosed in the foregoing specification, it is understood by those skilled in the art that variations and modifications thereof can be made without departing from the spirit and scope of the invention, as set forth in the following claims. Moreover, the corresponding structures, materials, acts, and equivalents of all means or step plus function elements in the claimed elements are intended to include any structure, material, or acts for performing the functions in combination with other claimed elements as specifically claimed.

I claim:

1. An overflow and isolation valve for use with the vapor recovery system of an underground liquid storage tank, the overflow valve being mounted on the storage tank and being in fluid-tight communication with the vapor recovery system, the storage tank having a liquid level therein, said valve comprising:

a) a valve body having a chamber defined therein;

b) said valve body including an elongate leg member, said leg member having a proximal end sealed on said valve body and a distal end extending away from said valve body;

c) a continuous bore defined within said leg member and extending along a longitudinal axis from the distal end to the proximal end of the leg member, said bore being in fluid-tight communication with said chamber at the proximal end of the leg member;

d) an integral float assembly supported on the distal end of said leg member, said float assembly being constructed and arranged for movement from an open position into a generally fluid-tight closed position on the distal end of said leg member in response to an increase in the level of the liquid held within the tank for preventing the passage of liquid through said leg member and into said chamber; and e) a threaded annular ring positioned within said leg member and extending inwardly of said bore toward said axis, said annular ring being positioned intermediate the proximal end and the distal end of said leg member.

2. The valve of claim 1, further comprising a vapor recovery system riser opening defined within said valve body and opening into said chamber in substantial registry with said bore.

3. The valve of claim 1, further comprising a threaded plug sized and shaped to be passed through said valve body and said bore and to be threadedly received on said annular ring to thereby form a fluid-tight seal for isolating said chamber from the tank in response thereto.

4. The valve of claim 3, wherein said plug is made of one of the materials selected from the group consisting of brass and bronze.

5. The valve of claim 3, said float assembly being constructed and arranged to be moved from said closed position into said open position as the plug is threadedly received on the threaded annular ring.

6. The valve of claim 1, wherein said float assembly is at least partially disposed within said bore.

7. The valve of claim 1, said float assembly comprising:

a float;

an elongated stem having a proximal end fastened to said float and a distal end extending away from said float; and guide means for guiding said stem for reciprocal movement with respect to the distal end of said leg member from said open position into said closed position, and back.

8. The valve of claim 7, wherein said guide means comprises a collar supported within said bore intermediate said annular ring and the distal end of said leg member, said collar having an opening sized and shaped to receive said stem defined therein and through which said stem is passed, said stem further comprising a stop formed at the distal end thereof for engagement with said collar so that the distal end of said stem cannot be fully withdrawn from said collar, whereby said float is positioned with respect to the distal end of said leg member by said stem and said collar.

9. The valve of claim 8, wherein said collar is positioned about the longitudinal axis of said bore.

10. The valve of claim 1, wherein said float assembly is constructed and arranged to be biased into said closed position on the distal end of said leg member when the tank is filled with liquid to ninety-five per cent tank capacity by volume.

11. The valve of claim 1, wherein said valve body and said leg member are formed as a unitary structure.

12. The valve of claim 1, wherein said valve body and said leg member are made of one of the materials selected from the group consisting of cast iron and aluminum.

13. An overflow and isolation valve for use with the vapor recovery system of an underground liquid storage tank, the overflow valve being mounted on the storage tank and being in fluid-tight communication with the vapor recovery system, the storage tank having a liquid level therein, said valve comprising:

a) a valve body having a chamber defined therein;

b) an elongate leg member formed as an integral part of said valve body, said leg member having a proximal end sealed on said valve body and a distal end extending away from said valve body;

c) a continuous bore defined within said leg member and extending from said distal end to said proximal end, said bore being in generally fluid-tight communication with the chamber within said valve body;

d) an integral float assembly positioned on the distal end of said leg member, said float assembly being constructed and arranged for reciprocal movement from an open position for allowing vapors through said leg member and into said chamber, into a generally fluid-tight closed position on the distal end of said leg member in response to the increase of the liquid level within the tank;

e) said float assembly including a float, an elongated stem having a proximal end fastened to said float and a distal end extending away from said float through a guide means for guiding said stem for reciprocal movement into said open and said closed positions; and f) a threaded annular ring defined within and formed as a part of said leg member, said threaded ring extending inwardly of said bore and being positioned intermediate the proximal end of said leg member and said float assembly.

14. The valve of claim 13, wherein said guide means comprises a collar supported within said bore intermediate said annular ring and the distal end of said leg member, said collar being sized and shaped to receive said stem therethrough, and wherein said stem further comprises a stop formed at the distal end thereof so that the distal end of said stem cannot be fully withdrawn from said collar.

15. The valve of claim 13, further comprising a vapor recovery system riser opening defined within said valve body and opening into said chamber, said riser opening being in substantial registry with said bore defined in the leg member.

16. The valve of claim 13, comprising a threaded plug sized and shaped to be passed through said valve body toward said annular ring, and to be threadedly received on said ring to form a fluid-tight seal of the chamber in the valve body from the tank.

17. An overflow and isolation valve assembly for use with the vapor recovery system of an underground liquid storage tank, said valve comprising:

a) a valve body, said valve body having a chamber defined therein;

b) an elongate leg member formed integrally with said valve body, said leg member having a proximal end sealed on said valve body and a distal end extending away from said valve body;

c) a continuous bore defined within said leg member and extending from said distal end to said proximal end thereof, said bore being in generally fluid-tight communication with the chamber defined within said valve body;

d) an integral float assembly mounted on the distal end of said leg member, e) a threaded annular ring defined within said leg member and extending inwardly of said bore, said annular ring being positioned intermediate the proximal end and the distal end of said leg member;

f) a vapor recovery system riser opening defined within said valve body in substantial registry with said bore; and g) a threaded plug sized and shaped to be passed through said riser opening and said valve body toward, and to be threadedly received on said annular ring to form a fluid-tight seal of the chamber defined within said valve body from the storage tank.

18. The valve of claim 17, said float assembly being constructed and arranged to be moved into an open position from a closed position in response to said plug being threadedly received on said ring.

19. A method of using an overflow and isolation valve assembly to isolate an underground liquid storage tank from a vapor recovery system in communication with the tank and used to vent vapor from the tank to the atmosphere, the overflow and isolation valve having a valve body sealed on the tank and a chamber defined within the valve body in communication with the vapor recovery system, said method comprising the steps of:

a) passing a threaded plug through the valve body into an elongate bore defined within an elongate extending away from the valve body, the bore extending from a proximal end of the leg member sealed on the valve body to a distal end of the leg member on which a float assembly is supported;

b) moving said plug into engagement with a threaded annular ring defined within said bore and positioned intermediate the proximal and distal ends of said leg member;

c) threading the plug into the annular ring; and d) forming a fluid-tight seal between the chamber within the valve body and the storage tank in response thereto.

20. The method of claim 19, comprising the additional step of moving the float assembly into an open position on the distal end of the leg member from a closed position in response to threading the plug into the annular ring.

* * * * *

UNITED STATES PATENT AND TRADEMARK OFFICE
CERTIFICATE OF CORRECTION

PATENT NO. : 5,682,917
DATED : November 4, 1997
INVENTOR(S) : Curving, III

It is certified that error appears in the above-identified patent and that said Letters Patent is hereby corrected as shown below:

Column 1, line 7, at the end of the line, delete --fluid--.

Column 1, line 23, after "opening" at the beginning of the line, delete --rather--.

Column 1, line 41, after "overflow valves," insert --are--.

Column 2, line 36, at the beginning of the line, delete --fluid--.

Column 4, line 37, after "leg member 12" at the end of the line, insert --are--.

Column 5, line 16, after "the prior" at the beginning of the line, delete "art. However" and insert --art, however--.

Column 7, line 15, after "float assembly", delete "or" and insert --of--.

Claim 19, column 10, line 39, of the claim, after "within an elongate" insert --leg member--.

Signed and Sealed this

Thirty-first Day of March, 1998

Attest:

BRUCE LEHMAN

*Attesting Officer*  *Commissioner of Patents and Trademarks*